Jan. 21, 1930.  C. E. ORDWAY  1,744,411
TYPE GAUGE
Filed April 21, 1927
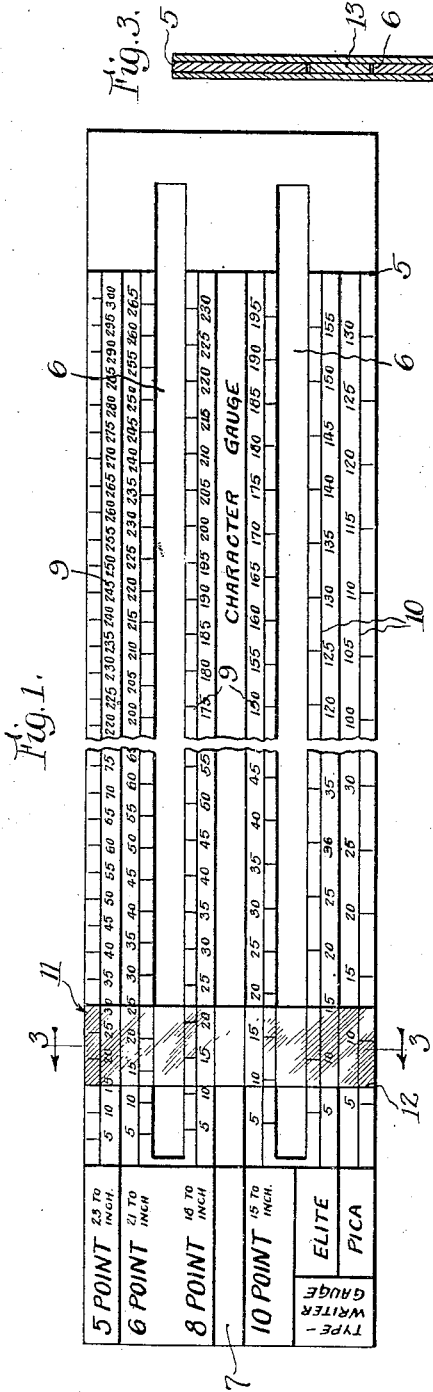
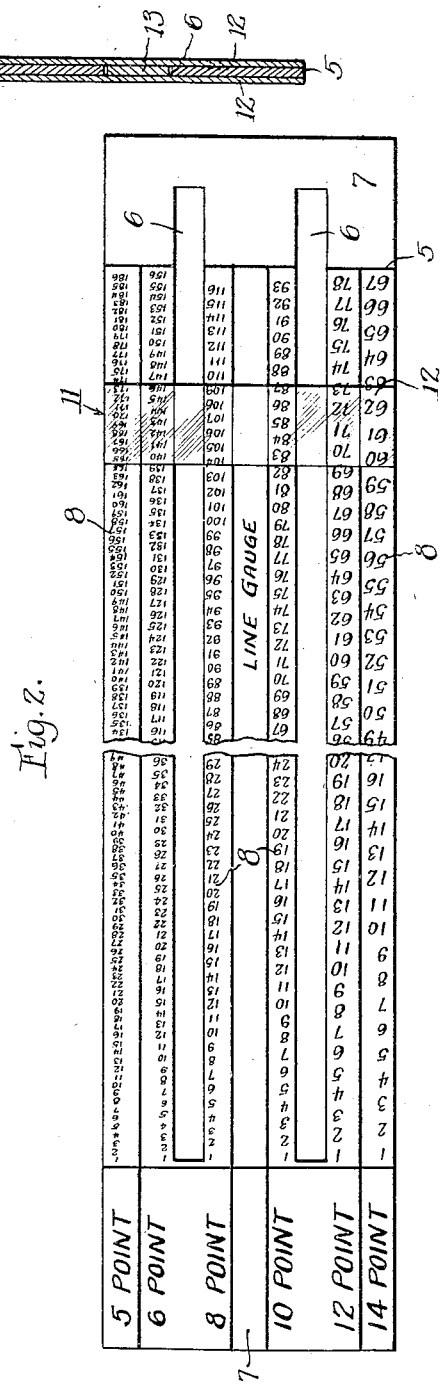
Inventor
Clara E. Ordway,
By Chindahl Parker Carlson
Attys.

Patented Jan. 21, 1930

1,744,411

UNITED STATES PATENT OFFICE

CLARA E. ORDWAY, OF CHICAGO, ILLINOIS

TYPE GAUGE

Application filed April 21, 1927. Serial No. 185,375.

The invention relates to type gauges and particularly to gauges for use in making the computations involved in the distribution of printed or typewritten copy over a sheet to be printed.

One object of the invention is to provide a new and improved gauge by means of which a manuscript may be rapidly converted into type form for distribution over a space or a series of irregularly formed adjoining spaces to be printed.

A further object is to provide an improved gauge of this character adapted to determine rapidly for any desired size of type the exact number of lines and characters which may be printed upon any space.

Another object is to provide an indicating means to facilitate reading the gauge.

Other objects and advantages will become apparent from the following description and the accompanying drawings, in which:

Figures 1 and 2 are fragmentary plan views of the invention showing opposite sides thereof.

Fig. 3 is a section taken on the line 3—3 of Fig. 1.

Although the invention is susceptible of various modifications and alternative constructions, I have shown and herein described in detail the preferred embodiment but it is to be understood that I do not thereby intend to limit the invention to the specific form disclosed but intend to cover all modifications and alternative constructions falling within the spirit and scope of the invention as expressed in the appended claims.

In attaining the objects of my invention I employ an elongated gauge member constructed to provide a plurality of different scales upon both sides thereof. In the present instance, the gauge comprises an elongated strip 5 of any suitable material such as non-transparent celluloid, which will permit various scales to be printed upon both sides of the strip. In order to increase the number of scales and to facilitate the reading of each, a plurality of slots 6, herein shown as two, of substantial width extend longitudinally of the strip 5. The slots stop short of each end to provide end tabs 7 upon which designations showing the size of the type to which the scale applies, or directions for using may be printed. It will be seen that by using two of the slots 6 in the gauge I may provide six scales upon each side of the strip, each of which will be adjacent an edge of the strip.

The scales may be of any kind which will give the desired computations and I have shown the gauge as being provided with two arrangements of type and one of typewriter scales. The type scales comprise what may be termed a line and a character gauge for various of the most commonly used sizes of type and are printed upon opposite sides of the ruler.

In the present embodiment the line gauge comprises scales 8 for six different sizes of types which scales denote the number of printed lines per page or space for each particular size of type. The character gauge scales 9 are similar except that they denote the number of characters in each printed line. There are, as shown, only four of the character scales the other two scales 10 on that side of the gauge being used in the determination of the number of typewritten characters in the manuscript or copy. Hence, if the total number of characters to be printed are known from the typewritten copy, and the size of the space to be printed is known, it is an easy matter to determine what size type should be used. Inversely if a certain sized space is to be printed with type of particular size, easy calculations may be made to determine the number of printed pages or the like. The gauge is further adapted to be used in "fitting copy" to any "layout" or plan of a printed page. Thus, for example, in "layouts" which are to be printed in a peculiar manner or are to include one or more cuts of irregular outline, the typewritten copy should correspond character for character with the printed sheet as it is to be. By applying the character and line gauges to the layout sheet the number of lines and characters in each may be determined for each irregular space upon the layout and the copy may be written accordingly.

Inasmuch as exact readings are essential for the most efficient operation of the gauge and since it may be difficult, especially in the smaller sizes of type, accurately to determine the scale readings, I have provided an indicating means to overcome this difficulty. In the preferred form this means comprises a transparent slide 11 mounted upon the gauge for sliding movement longitudinally thereof. The slide 11 embodies substantially rectangular face plates 12 extending transversely across each side of the gauge. The plates 12 are secured together and mounted upon the gauge in this instance by means of an intermediate pair of spacers 13 slidably fitted into the slots 6 and of substantially the same thickness as the gauge. The face plates 12 and the spacers 13 may be secured together in any suitable manner as by means of a strong adhesive or the like. As shown, the scales stop short of one end of the slots 6 permitting the indicating slide 11 to be withdrawn to a position remote from the scales, so that the entire range of the scales may be covered by said slide or it may be moved to an out of the way position. Thus, an indicating slide has been provided which presents a straight transverse edge on each side of the gauge and which may be easily moved longitudinally of the gauge to facilitate reading any of the scales thereon. The indicating slide is also advantageous in that a reading of the gauge may be taken using the slide, which reading may if desired be preserved for reference.

From the foregoing disclosure it will be readily apparent that I have provided a gauge for use in conjunction with the conversion of a manuscript into type form, which is simple, easy to use, and, through the provision of an indicating slide, is capable of being easily and accurately read.

I claim as my invention:

1. A type gauge having slots extending longitudinally thereof to provide a plurality of edges, a scale adjacent each edge for measuring printed matter, and an indicating slide engaging said slots for movement longitudinally of said gauge, said slots extending at one end beyond said scales to permit said slide to be moved out of registration with said scales.

2. A gauge of the character described having a pair of parallel slots extending longitudinally thereof, a plurality of scales positioned respectively adjacent the edges on one side of said gauge, said scales comprising differently sized characters for the determination of the number of type characters in one line of type, a plurality of different scales positioned respectively along the edges of the other side of said gauge, part of said last mentioned scales being for the determination of lines and having characters of different sizes, and others of said last mentioned scales being for the measurement of typewritten copy, said slots extending beyond the ends of said scales, and an indicator mounted on said gauge, said indicator having guide means engaging said slots and said slots permitting said indicator to be moved out of registration with said scales.

3. A gauge of the character described comprising a flat elongated sheet of material having a pair of parallel slots extending longitudinally thereof, a plurality of scales positioned respectively along the edges on one side of said sheet, said scales comprising differently sized characters for the determination of the number of type characters in one line of type, a plurality of different scales positioned respectively along the edges of the other side of said sheet, part of said last mentioned scales being for the determination of lines and having characters of different sizes, and others of said last mentioned scales being for the measurement of typewritten copy, said slots extending at one end of said sheet beyond the ends of said scales.

In testimony whereof, I have hereunto affixed my signature.

CLARA E. ORDWAY.